No. 890,825. PATENTED JUNE 16, 1908.
S. TYER.
WIRE STRETCHER.
APPLICATION FILED FEB. 20, 1908.
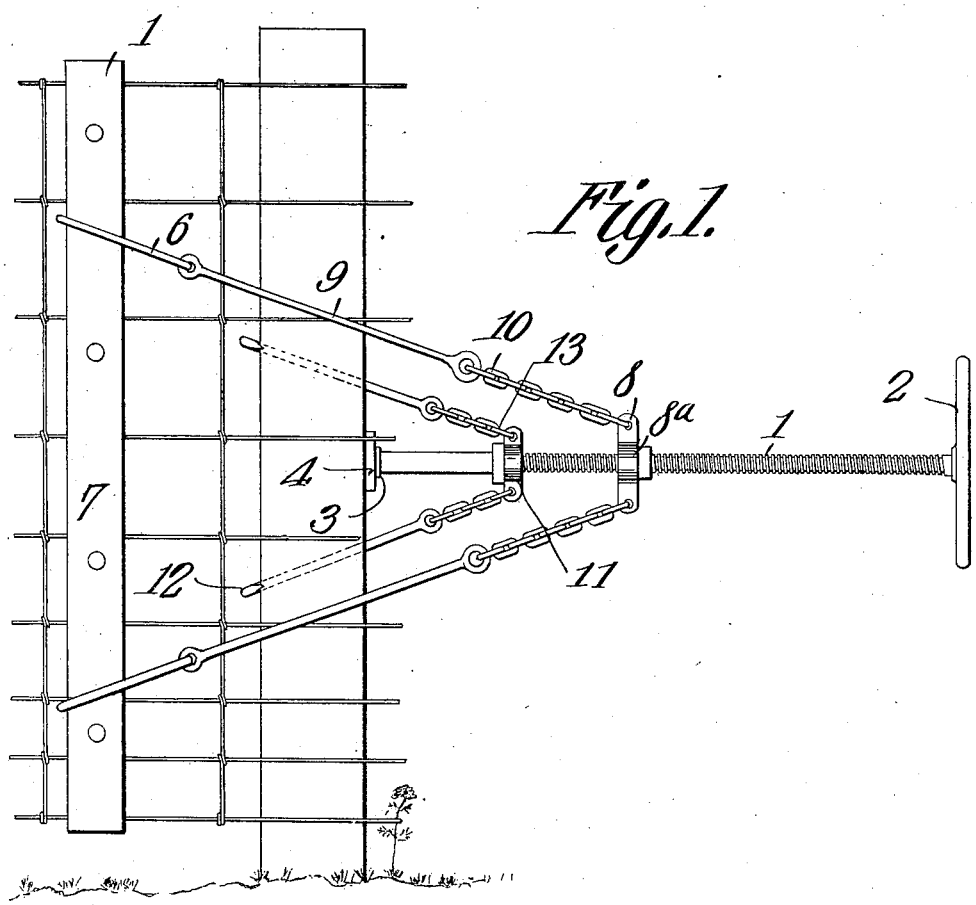
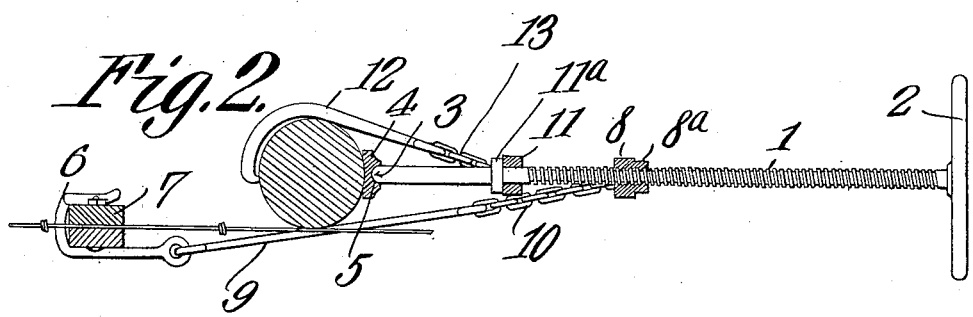
Witnesses
Inventor
Sampson Tyer
By C.A. Snow & Co.
Attorneys

UNITED STATES PATENT OFFICE.

SAMPSON TYER, OF GRAPELAND, TEXAS.

WIRE-STRETCHER.

No. 890,825.     Specification of Letters Patent.     Patented June 16, 1908.

Application filed February 20, 1908. Serial No. 416,938.

*To all whom it may concern:*

Be it known that I, SAMPSON TYER, a citizen of the United States, residing at Grapeland, in the county of Houston and State of Texas, have invented a new and useful Wire-Stretcher, of which the following is a specification.

My invention relates to improvements in wire stretchers, more particularly for stretching wire fabric equipped either with barbs or formed of plain wire strands, for fence purposes.

It has for its object to engage the stretcher with a wire fabric and stretch the same in a simple and expeditious manner without other assistance than simply the device itself. In other words, without having to be supported or propped from the surface or ground in its manipulation, as required in certain forms of this class of devices.

Additional objects and advantages of the invention will be apparent from the subjoined description and accompanying illustration.

In the accompanying drawings, which illustrate the preferred embodiment of my invention, Figure 1 is a side elevation showing my invention as applied for use. Fig. 2 is a horizontal section thereof.

Similar numerals of reference are employed to indicate corresponding parts throughout the several figures of the drawings.

In the practice of my invention I employ a suitable screw shaft 1, having a conveniently manipulating hand wheel 2 at one end, and its opposite end rounded as at 3 and bearing in a foot or plate 4 provided with a corresponding cavity or seat 5 for the reception of said rounded end, which in practice bears against the fence post.

6 refers to two hooks of any contour adapted for application to a two part clamp 7 for application to wire fabric, such as may be used in constructing fences, connections being effected between such hooks and the threaded sleeve 8 formed with ears 8ª, said sleeve having screw-threaded connections with the screw shaft 1 passing therethrough. Said connections between said hooks and arm sleeve 8 may be formed by rods 9 suitably connected to said hooks, and with chains 10 in turn connected to said rods or links and said arm at its ends. Also arranged upon a plain surface of said screw shaft in advance of the same, a second sleeve but not screw-threaded, resting against a shoulder or collar 11ª formed on the unthreaded portion of said screw shaft, said sleeve having suitably connected thereto hooks 12 effective for engagement with a fence post, the connection between said hooks and said sleeve 11 being effected preferably by means of chains or links 13 shorter than the connections between the sleeve 8 and hook 6.

It will be noted that the connections between the hooks 6 and arm 8, and the connections between the hooks 12 and arm 11 are adapted to pass upon opposite sides of the fence post, having the effect to center the screw 1, thus preventing lateral motion of the latter. The rounded end 3 of the screw shaft 1 seated in the socket 5 of plate 4 provides a universal joint permitting the screw shaft 1 to adjust itself to centered position by the action of the connections with sleeves 8 and 11 extending on either side of the screw shaft and a fence post. It will be noted that as the screw shaft 1 is suitably actuated by the application of proper force to the hand wheel 2, the hooks 12 being engaged with the fence post, the sleeve 8 by reason of its screw threaded connection with said shaft, will be suitably engaged thereby and exert a pulling force on the hooks 6 and therefore put the clamps 7 under stress which will suitably stretch the fence fabric in position for attachment to the fence post, as will be readily understood. Also, it will be observed that this device is exceedingly expeditious, simple and effective in operation, and requires no additional bracing from the ground or surface, as is the case, as before stated, with certain devices of this class.

Latitude is allowed herein for making various changes in the details of construction, arrangement and disposition of the above mentioned parts without departing from the spirit of my invention.

What is claimed is:—

In a wire stretcher, a clamp for wire fabric, an operating screw shaft with a smooth forward portion having a rounded end; a plate with a rounded cavity adapted to receive the rounded end of the screw shaft, and hold the plate against a fence post; a traveling sleeve threaded on said screw shaft; hook connections connected to said traveling sleeve, and adapted to extend on one side of said fence post and engage with said wire fabric clamp, a second sleeve mounted on the said smooth forward part of the screw shaft in advance of said traveling sleeve; a collar fixed on said smooth portion of the screw shaft against which said second sleeve abuts; and short hook connections connected to said second sleeve, and adapted to extend on the opposite side of the fence post from the first hook connections and to engage with said fence post.

In testimony that I claim the foregoing as my own, I have hereto affixed my signature in the presence of two witnesses.

SAMPSON TYER.

Witnesses:
    JESSE ALLEN,
    A. W. PHILLIPS, Jr.